(12) United States Patent
Chang

(10) Patent No.: US 8,217,354 B2
(45) Date of Patent: Jul. 10, 2012

(54) REMOTE SENSING SYSTEM AND ELECTRONIC APPARATUS HAVING SAME

(75) Inventor: Jen-Tsorng Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 410 days.

(21) Appl. No.: 12/485,018

(22) Filed: Jun. 15, 2009

(65) Prior Publication Data

US 2010/0072372 A1   Mar. 25, 2010

(30) Foreign Application Priority Data

Sep. 19, 2008   (CN) .......................... 2008 1 0304590

(51) Int. Cl.
*G01J 5/02* (2006.01)
(52) U.S. Cl. .............. 250/339.06; 250/339.01; 250/349; 463/37; 463/39; 463/43
(58) Field of Classification Search ............. 250/339.01, 250/339.06; 463/37, 39, 43
See application file for complete search history.

(56) References Cited

U.S. PATENT DOCUMENTS

| 2004/0266528 | A1* | 12/2004 | Wang | 463/37 |
| 2007/0060384 | A1* | 3/2007 | Dohta | 463/43 |
| 2007/0211026 | A1* | 9/2007 | Ohta | 345/158 |
| 2007/0236452 | A1* | 10/2007 | Venkatesh et al. | 345/158 |
| 2008/0039202 | A1* | 2/2008 | Sawano et al. | 463/39 |
| 2008/0131131 | A1* | 6/2008 | Chen | 398/106 |
| 2009/0305786 | A1* | 12/2009 | Chang | 463/37 |

FOREIGN PATENT DOCUMENTS

| CN | 101073047 | 11/2007 |
| CN | 101236468 | 8/2008 |

* cited by examiner

*Primary Examiner* — David Porta
*Assistant Examiner* — Casey Bryant
(74) *Attorney, Agent, or Firm* — Altis Law Group, Inc.

(57) ABSTRACT

A remote sensing system includes a first light source, a second light source, two image capturing devices and a processing unit. The first light source is configured for emitting infrared light of a first central wavelength. The second light source is configured for emitting infrared light of a second central wavelength. The two image capturing devices is configured for capturing images of the first and second light sources. The image capturing devices each includes an infrared sensitive image sensor and an infrared pass filter having two passbands for respectively allowing the infrared light of the first and second central wavelengths to pass therethrough. The processing unit is configured for analyzing the images captured by the image capturing devices thereby determining positions of the light sources relative to the image capturing devices.

16 Claims, 5 Drawing Sheets

REMOTE SENSING SYSTEM AND ELECTRONIC APPARATUS HAVING SAME

BACKGROUND

1. Technical Field

The present invention relates generally to electronic products, and more particularly, to a remote sensing system and an electronic apparatus having the same.

2. Description of the Related Art

Computer games, especially simulation games, are more and more popular in the modern society. A system emulating a game console generally includes a host in communication with a display device, for displaying images; and a game console in communication with the host, for performing various playing operations.

For example, the game console includes a light emitting diode (hereinafter "LED"). Three linear image pickup elements each having a linear image sensor are positioned in the vicinity of the display device. Each of the linear image pickup elements takes images of the LED and obtains one light spot on the linear image sensor. Then the images are transmitted to an image processing unit. The image processing unit calculates the coordinate of the console based on positions of the light spots on the linear image sensors. Thus, the host can detect linear movements of the console in a three-dimensional space. However, the rotation of the console around a central axis of the LED cannot be detected, because the position of the LED is not changed.

Therefore, a remote sensing system and an electronic apparatus having the same are needed to overcome the above shortcomings.

BRIEF DESCRIPTION OF THE DRAWING

The components in the drawings are not necessarily drawn to scale, the emphasis instead being placed upon clearly illustrating the principles of the present embodiments.

Figure 1:
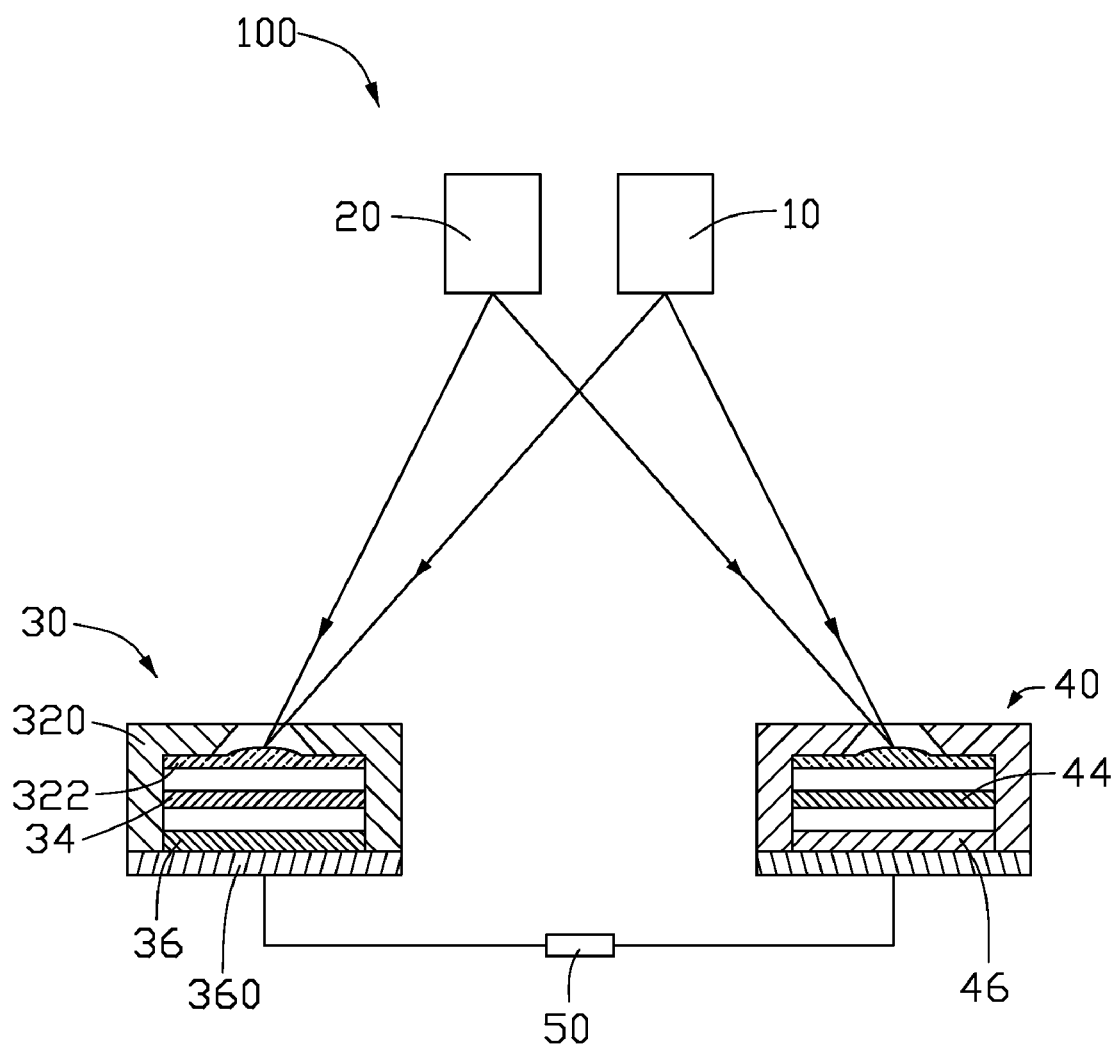
FIG. 1 is a schematic view of a remote sensing system in accordance with a first exemplary embodiment.

Corresponding reference characters indicate corresponding parts. The exemplifications set out herein illustrate at least one embodiment of the present display device having a brightness enhancement panel, in one form, and such exemplifications are not to be construed as limiting the scope of the disclosure in any manner.

DETAILED DESCRIPTION

Reference will now be made to the drawings to describe embodiments of the present remote sensing system and the electronic apparatus using the same.

Referring to FIG. 1, a remote sensing system 100 in accordance with a first exemplary embodiment includes a first light source 10, a second light source 20, a first image capturing device 30 and a second image capturing device 40.

Each of the first and second light sources 10 and 20 can be a point light source, such as an LED. The two light sources 10 and 20 are spaced from each other. The first light source 10 is configured for emitting infrared light with a certain wavelength band. The second light source 20 is configured for emitting infrared light with a different wavelength band from the first light source 10.

Figure 2:
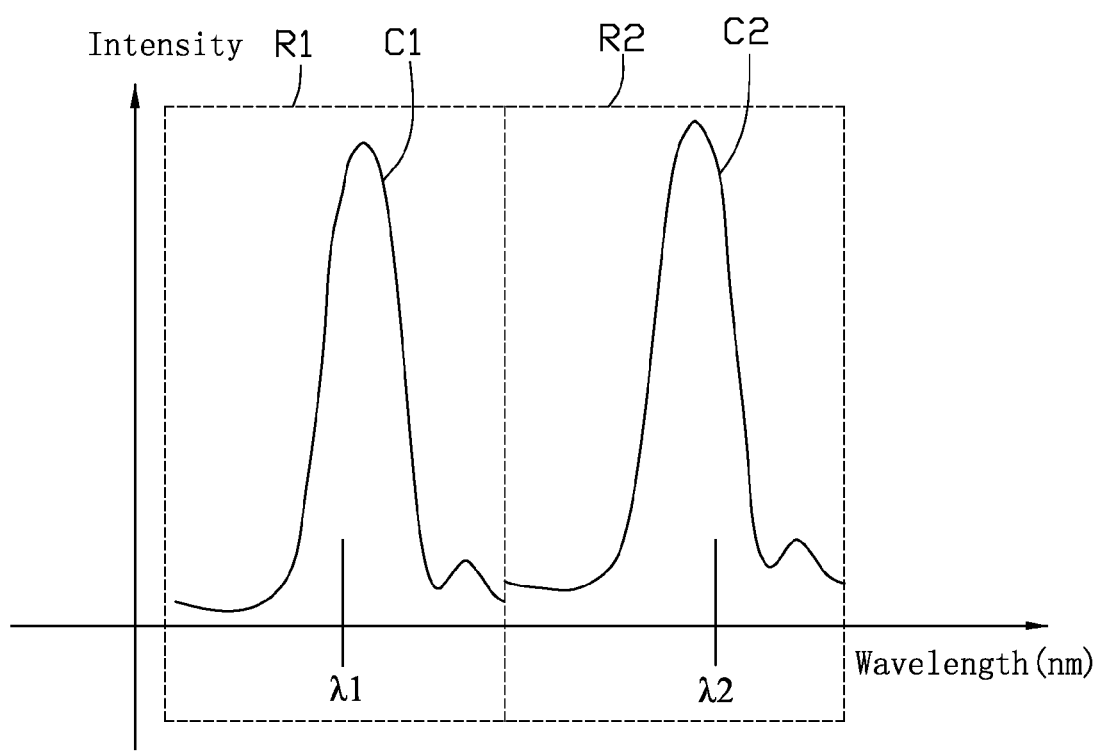
FIG. 2 shows a graph of light output spectrum of a first light source and a second light source of the remote sensing system in FIG. 1.

Referring to FIG. 2, an example of wavelength-intensity curves of light emitted from the first and second light sources 10 and 20 are shown. For easily comparing the first light source 10 with the second light source 20, the wavelength-intensity curve corresponding to the first light source 10 and the wavelength-intensity curve corresponding to the second light source 20 are shown in a same figure, i.e. FIG. 2. A curve C1 in a dashed rectangle R1 shows a wavelength-intensity curve of the light emitted from the first light source 10. It is seen from FIG. 2 that the light with a wavelength $\lambda_1$ has a highest intensity in the light emitted from the first light source 10. A curve C2 in a dashed rectangle R2 shows a wavelength-intensity curve of the light emitted from the first light source 20. It is seen from FIG. 2 that the light with a wavelength $\lambda_2$ has a highest intensity in the light emitted from the second light source 20. The wavelengths $\lambda_1$ and $\lambda_2$ meet the following: 700 nanometers (nm for short)<$\lambda_1$<$\lambda_2$<1000 nm.

The first image capturing device 30 includes a lens barrel 320, an optical lens 322, an infrared pass filter 34 and an image sensor 36. The optical lens 322 and the infrared pass filter 34 are mounted in the lens barrel 320 and aligned with each other. The image sensor 36 is positioned at one end of the lens barrel 320 and aligned with the optical lens 322 and the infrared pass filter 34. In this embodiment, the image sensor 36 is infrared sensitive. The image sensor 36 includes a plurality of pixels arranged in an m by n (m×n) array, such as in a 1280×1024 array. The letters "m" and "n" denotes integers larger than one. The image sensor 36 is installed on a circuit board 360. The optical lens 322 is configured for focusing light emitted from the first and second light sources 10 and 520 on the image sensor 36.

Figure 3:
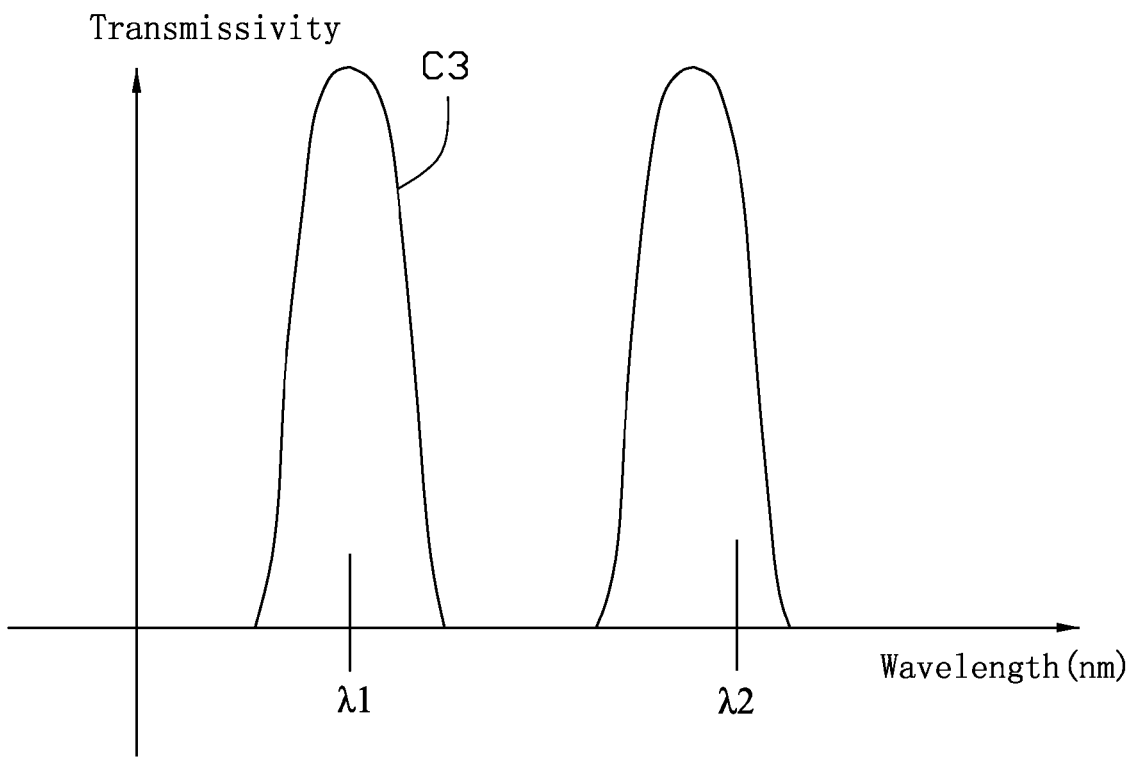
FIG. 3 shows a transmittance spectrum of a dual-pass-band infrared pass filter in FIG. 1.

The infrared pass filter 34 blocks all visible light letting only infrared light with certain wavelengths pass. As shown in FIG. 3, a curve C3 of transmissivity-wavelength relationship of the infrared pass filter 34 is illustrated. The curve C3 has two peak values, which correspond to $\lambda_1$ and $\lambda_2$, also shown in FIG. 2. It is to understand that most of the light emitted from the first light sources 10 and 20 can pass through the infrared pass filter 34. In other words, most of the light emitted from the first and second light sources 10 and 20 can be captured by the first image capturing device 30. It is seen from FIG. 3 that, most of the interferential light can be blocked or received by the infrared bankpass filter 34.

In this embodiment, the second image capturing device 40 is identical with the first image capturing device 30. It is understood that the second image capturing device 40 can be different from the first image capturing device 30, as long as the second image capturing device 40 includes an infrared pass filter 44 and an infrared sensitive image sensor 46.

The remote sensing system 100 further includes a processing unit 50. The processing unit 50 is electrically connected with the image sensor 36 and the image sensor 46. The processing unit 50 is configured for receiving the image signals from the image sensors 36 and 46 and processing the image signals to calculate the position of the first and second light sources 10 and 20.

In use, each of the first and second image capturing devices 30 and 40 takes an image of the light emitted from the first light source 10 and generates an image signal. The image signals are transmitted to the processing unit 50. Because the light emitted from the first light source 10 and second light source 20 has different wavelength, the images of the first light sources 10 and 20 can be distinguished. It is easy to understand that a first angle of the first light source 10 with respect to the center axis of the first image capturing device 30 and a second angle of the first light source 10 with respect to the center axis of the second image capturing device 40 can be calculated. The processing unit 50 calculates a position of the first light source 10 relative to the first and second image capturing devices 30 and 40 based on the first and second angles. Simultaneously, the processing unit 50 calculates a position of the second light source 20 relative to the first and second image capturing devices 30 and 40 in a same manner.

When the first and second light sources 10 and 20 move a distance relative to the first and second image capturing devices 30 and 40, the processing unit 50 calculates another position of each of the first and second light sources 10 and 20 in the above manner.

Figure 4:
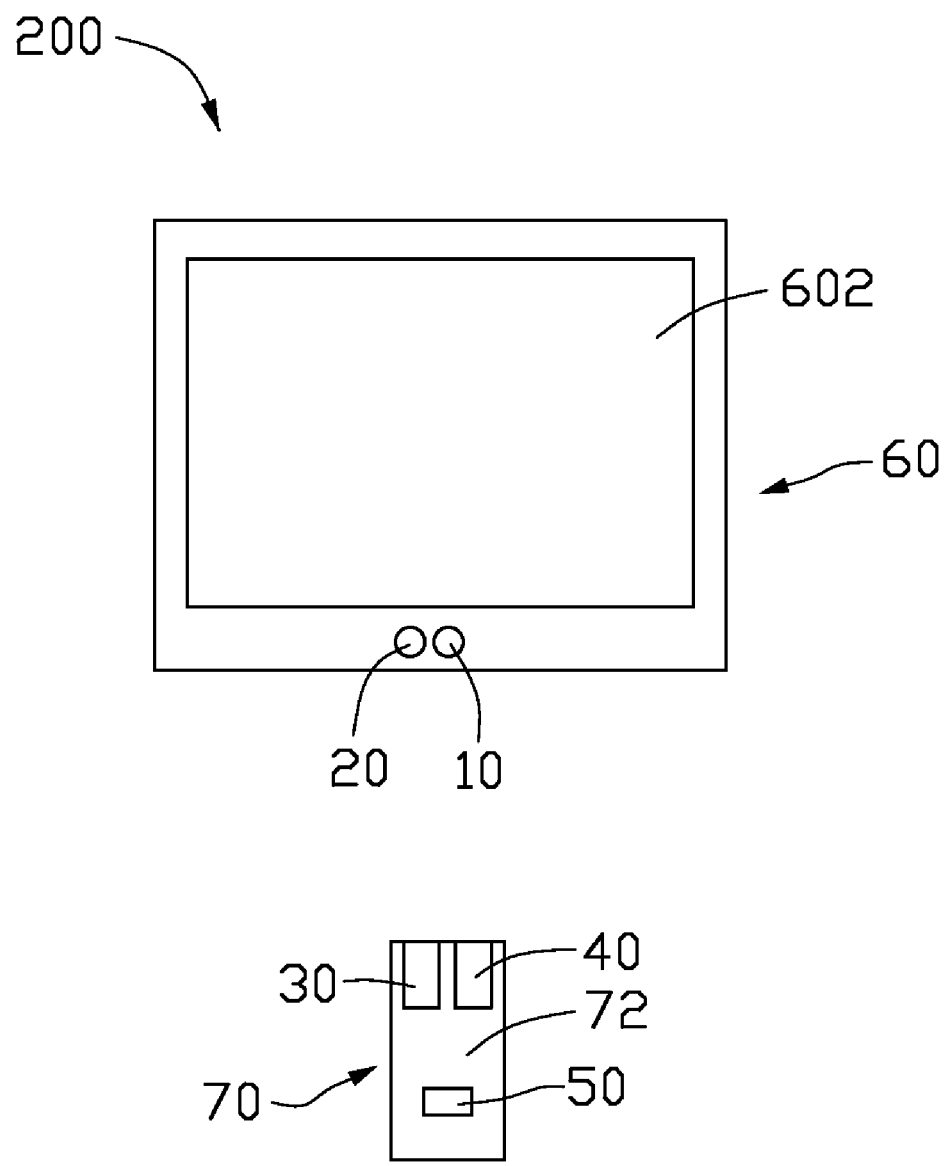
FIG. 4 is an electronic apparatus using the remote sensing system in FIG. 1 in accordance with a second exemplary embodiment.

Referring to FIG. 4, an electronic apparatus 200 in accordance with a second exemplary embodiment includes a display device 60 and a remote control unit 70. The electronic apparatus 200 can be a game player. The display device 60 includes a display screen 602. The first and second light sources 10 and 20 are installed on/in the display device 60 and adjacent to the display screen 602. The first and second light sources 10 and 20 are spaced from each other. The remote control unit 70 includes a housing 72, the first and second image capturing devices 30 and 40, and the processing unit 50. The first image capturing device 30, the second image capturing devices 40 and the processing unit 50 are installed in the housing 72. The first and second image capturing devices 30 and 40 are exposed to the exterior such that the image capturing devices 30 and 40 can pickup images of the first and second light sources 10 and 20. The remote control unit 70 is configured for controlling a function of the electronic apparatus 200, such as on and off, or remote-controlling a motion of an object showing on the display screen 602.

The electronic apparatus 200 applies the remote sensing system 100 to perform a remote controlling function. A linear movement of the remote control unit 70 can be detected through sensing each one of the first and second light sources 10 and 20 by the first and second image capturing devices 30 and 40. When rotating the remote control unit 70, at least one of the first and second image capturing devices 30 and 40 will move relative to the two light sources 10 and 20. Therefore, the rotation of the remote control unit 70 can also be detected.

Figure 5:
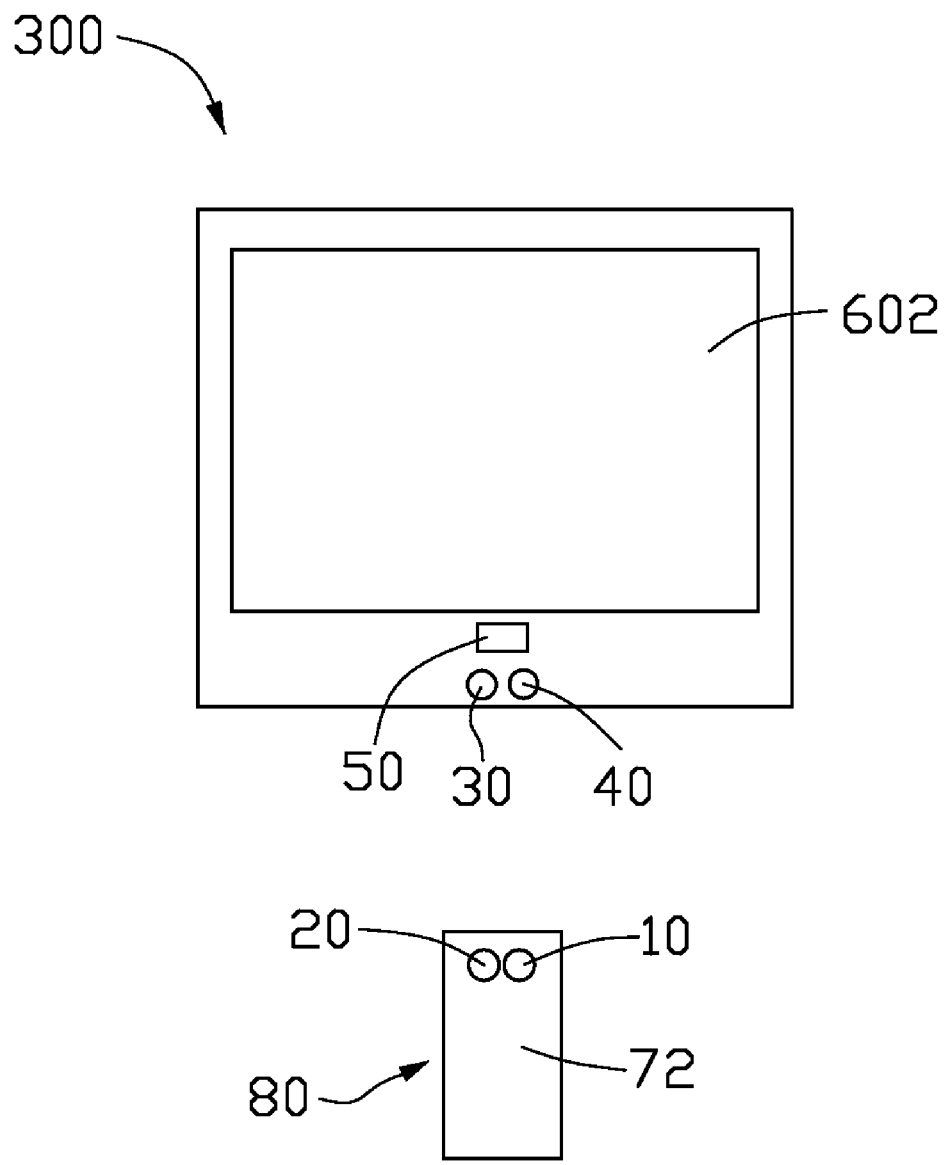
FIG. 5 is an electronic apparatus using the remote sensing system in FIG. 1 in accordance with a third exemplary embodiment.

Referring to FIG. 5, an electronic apparatus 300 in accordance with a third exemplary embodiment is provided. The electronic apparatus 300 is similar to the electronic apparatus 200. The distinguishing features are that in the electronic apparatus 300, the first and second light sources 10 and 20 are installed in/on the housing 72 to form a remote control unit 80, and the first image capturing device 30, the second image capturing device 40 and the processing unit 50 are installed in/on the display device 60 and adjacent to the display screen 602. In a similar manner to the electronic apparatus 200, the linear movement and the rotation of the remote control unit 80 can be detected.

It is to be understood that the number of the light source and/or the image capturing device in the remote sensing system can be more than two such that the position of the console can be detected more accurately.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the present invention.

What is claimed is:

1. A remote sensing system, comprising:
 a first light source for emitting infrared light of a first central wavelength;
 a second light source for emitting infrared light of a second central wavelength band different from the first central wavelength;
 a first image capturing device capturing two different images of the first and second light sources, a second image capturing device capturing two different images of the first and second light sources, the image capturing devices each comprising an infrared sensitive image sensor and an infrared pass filter having two passbands for respectively allowing the infrared light of the first and second central wavelengths to pass therethrough;
 a processing unit for analyzing the images captured by the first and second image capturing devices thereby determining positions of the light sources relative to the image capturing devices.

2. The remote sensing system of claim 1, wherein each of the first and second light sources comprises an infrared LED.

3. The remote sensing system of claim 1, wherein the first and second central wavelengths are in the range from 700 nm to 1000 nm.

4. The remote sensing system of claim 1, wherein each of the image capturing devices comprises an optical lens for focusing light incident on the respective infrared sensitive image sensor.

5. The remote sensing system of claim 1, wherein the first image capturing device includes a first lens barrel, a first optical lens, a first infrared pass filter and a first image sensor, the first optical lens and the first infrared pass filter are mounted in the first lens barrel and aligned with each other, the first image sensor is positioned at one end of the first lens barrel and aligned with the first optical lens and the first infrared pass filter, the first optical lens focuses light emitted from the first and second light sources and on the first image sensor.

6. The remote sensing system of claim 5, wherein the second image capturing device is identical with the first image capturing device, and includes a second lens barrel, a second optical lens, a second infrared pass filter and a second image sensor, the second optical lens and the second infrared pass filter are mounted in the second lens barrel and aligned with each other, the second image sensor is positioned at one end of the second lens barrel and aligned with the second optical lens and the second infrared pass filter, the second optical lens focuses light emitted from the first and second light sources and on the second image sensor.

7. The remote sensing system of claim 6, wherein the processing unit is electrically connected with the first and second image sensors, the processing unit receives the image signals from the first and second image sensors and processing the image signals to calculate the position of the first and second light sources.

8. An electronic apparatus, comprising:
 a remote control unit comprising a housing and two light sources installed in/on the housing, the two light sources comprising:
 a first light source for emitting infrared light of a first central wavelength;
 a second light source for emitting infrared light of a second central wavelength;
 a first image capturing device capturing two different images of the first and second light sources, a second image capturing device capturing two different images of the first and second light sources, the image capturing devices each comprising an infrared sensitive image sensor and an infrared pass filter having two passbands for respectively allowing the infrared light of the first and second central wavelengths to pass therethrough;

a processing unit for analyzing the images captured by the image capturing devices thereby determining positions of the light sources relative to the image capturing devices.

9. The electronic apparatus of claim 8, wherein each of the first and second light sources includes an infrared LED.

10. The electronic apparatus of claim 8, wherein each of the image capturing devices comprises an optical lens for focusing light on the respective infrared sensitive image sensor.

11. The electronic apparatus of claim 8, further comprising a display device having a display screen, the plurality of image capturing device being positioned adjacent to the display screen.

12. An electronic apparatus, comprising:
a first light source for emitting infrared light of a first central wavelength;
a second light source for emitting infrared light of a second central wavelength;
a remote control unit comprising a housing and two image capturing devices, a first image capturing device capturing two different images of the first and second light sources, a second image capturing device capturing two different images of the first and second light sources, the image capturing devices each comprising an infrared sensitive image sensor and an infrared pass filter having two passbands for respectively allowing the infrared light of the first and second central wavelengths to pass therethrough; and
a processing unit for analyzing the images captured by the image capturing devices thereby determining positions of the light sources relative to the image capturing devices.

13. The electronic apparatus of claim 12, wherein each of the first and second light sources includes an infrared LED.

14. The electronic apparatus of claim 12, wherein each of the light capturing devices comprises an optical lens for focusing light on the respective infrared sensitive image sensor.

15. The electronic apparatus of claim 12, further comprising a display device having a display screen, the plurality of light sources being positioned adjacent to the display screen.

16. The electronic apparatus of claim 12, wherein the processing unit is installed in/on the housing.

* * * * *